(12) United States Patent
Lee et al.

(10) Patent No.: US 12,265,674 B2
(45) Date of Patent: Apr. 1, 2025

(54) DISPLAY DEVICE

(71) Applicant: Samsung Display Co., LTD., Yongin-si (KR)

(72) Inventors: Bong Won Lee, Yongin-si (KR); Tae Hyoung No, Yongin-si (KR); Young Soo Yoon, Yongin-si (KR); Moo Jong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/467,539

(22) Filed: Sep. 14, 2023

(65) Prior Publication Data

US 2024/0288965 A1 Aug. 29, 2024

(30) Foreign Application Priority Data

Feb. 23, 2023 (KR) .................... 10-2023-0024549

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
None
See application file for complete search history.

(56) References Cited

U.S. PATENT DOCUMENTS

| 11,460,948 | B2 | 10/2022 | Han et al. | |
| 11,520,440 | B2* | 12/2022 | Kim | G06V 40/1306 |
| 11,797,115 | B2* | 10/2023 | Kim | G06F 3/041662 |
| 2015/0138146 | A1* | 5/2015 | Hong | G06F 3/0446 |
| | | | | 345/174 |
| 2020/0013844 | A1* | 1/2020 | Cho | H10K 59/124 |
| 2020/0091252 | A1* | 3/2020 | Bang | H10K 50/82 |
| 2021/0083013 | A1* | 3/2021 | Bang | H10K 50/84 |
| 2022/0179513 | A1* | 6/2022 | Kim | G06F 3/04164 |
| 2022/0199714 | A1* | 6/2022 | Jung | H10K 59/38 |

FOREIGN PATENT DOCUMENTS

| CN | 112035013 A | 12/2020 |
| CN | 115315810 A | 11/2022 |
| KR | 10-1523596 B1 | 5/2015 |
| WO | WO 2011/005977 A2 | 1/2011 |

* cited by examiner

*Primary Examiner* — Parul H Gupta
(74) *Attorney, Agent, or Firm* — Womble Bond Dickinson (US) LLP

(57) ABSTRACT

A display device includes a pixel in a display area, sensing electrodes overlapping the pixel, a sensing pad in a non-display area, a sensing connection line in the non-display area, and electrically connected to the sensing pad, a sensing signal line in the non-display area, and electrically connected to the sensing electrodes, and a power line extending from the non-display area, and electrically connected to the pixel, wherein the sensing signal line is electrically connected to the sensing connection line through an opening or indentation defined by the power line.

20 Claims, 13 Drawing Sheets

DISPLAY DEVICE

CROSS-REFERENCE TO RELATED APPLICATION

This application claims priority to, and the benefit of, Korean Patent Application No. 10-2023-0024549 filed on Feb. 23, 2023, in the Korean Intellectual Property Office, the entire disclosure of which is incorporated herein by reference.

BACKGROUND

1. Field

The present disclosure generally relates to a display device.

2. Description of the Related Art

Recently, as interest in information displays is increased, research and development of display devices have been continuously conducted.

SUMMARY

Embodiments provide a display device capable of reducing or minimizing noise of a sensing line.

In accordance with an aspect of the present disclosure, there is provided a display device including a pixel in a display area, sensing electrodes overlapping the pixel, a sensing pad in a non-display area, a sensing connection line in the non-display area, and electrically connected to the sensing pad, a sensing signal line in the non-display area, and electrically connected to the sensing electrodes, and a power line extending from the non-display area, and electrically connected to the pixel, wherein the sensing signal line is electrically connected to the sensing connection line through an opening or indentation defined by the power line.

The power line may at least partially overlap the sensing signal line.

The display device may further include a display pad in the non-display area, and a display signal line in the non-display area, and electrically connected to the pixel.

The power line may be between the display signal line and the sensing signal line.

The power line may at least partially overlap the display signal line.

The sensing electrodes may include first sensing electrodes located along a first direction.

The sensing electrodes may further include second sensing electrodes located along a second direction intersecting the first direction.

The display device may further include connection electrodes electrically connecting the first sensing electrodes adjacent to each other in the first direction.

The display device may further include a first sensing conductive layer, a second sensing conductive layer on the first sensing conductive layer, and an insulating layer between the first sensing conductive layer and the second sensing conductive layer.

The first sensing conductive layer may include the connection electrodes.

The second sensing conductive layer may include the first sensing electrodes and the second sensing electrodes.

In accordance with another aspect of the present disclosure, there is provided a display device including a pixel in a display area, sensing electrodes overlapping with the pixel, a sensing pad in a non-display area, a sensing connection line in the non-display area, and electrically connected to the sensing pad, a sensing signal line in the non-display area, and electrically connected to the sensing electrodes, and a power line extending from the non-display area, and electrically connected to the pixel, wherein the sensing signal line is electrically connected to the sensing connection line through a contact hole, and wherein the power line surrounds at least a portion of an edge of the contact hole is plan view.

The edge of the contact hole may include first to fourth sides, and the power line surrounds the first side and the second side while excluding the third side and the fourth side.

The edge of the contact hole may include first to fourth sides, wherein the power line surrounds the first to third sides while excluding the fourth side.

The power line may at least partially overlap the sensing signal line.

The display device may further include a display pad in the non-display area, and a display signal line in the non-display area, and electrically connected to the pixel.

The power line may at least partially overlap the display signal line.

The display signal line may correspond to a first conductive layer, wherein the power line corresponds to a second conductive layer, and wherein the sensing signal line corresponds to a third conductive layer.

The second conductive layer may be between the first conductive layer and the third conductive layer.

The sensing connection line may correspond to the first conductive layer.

BRIEF DESCRIPTION OF THE DRAWINGS

Embodiments will now be described more fully hereinafter with reference to the accompanying drawings. However, they may be embodied in different forms, and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
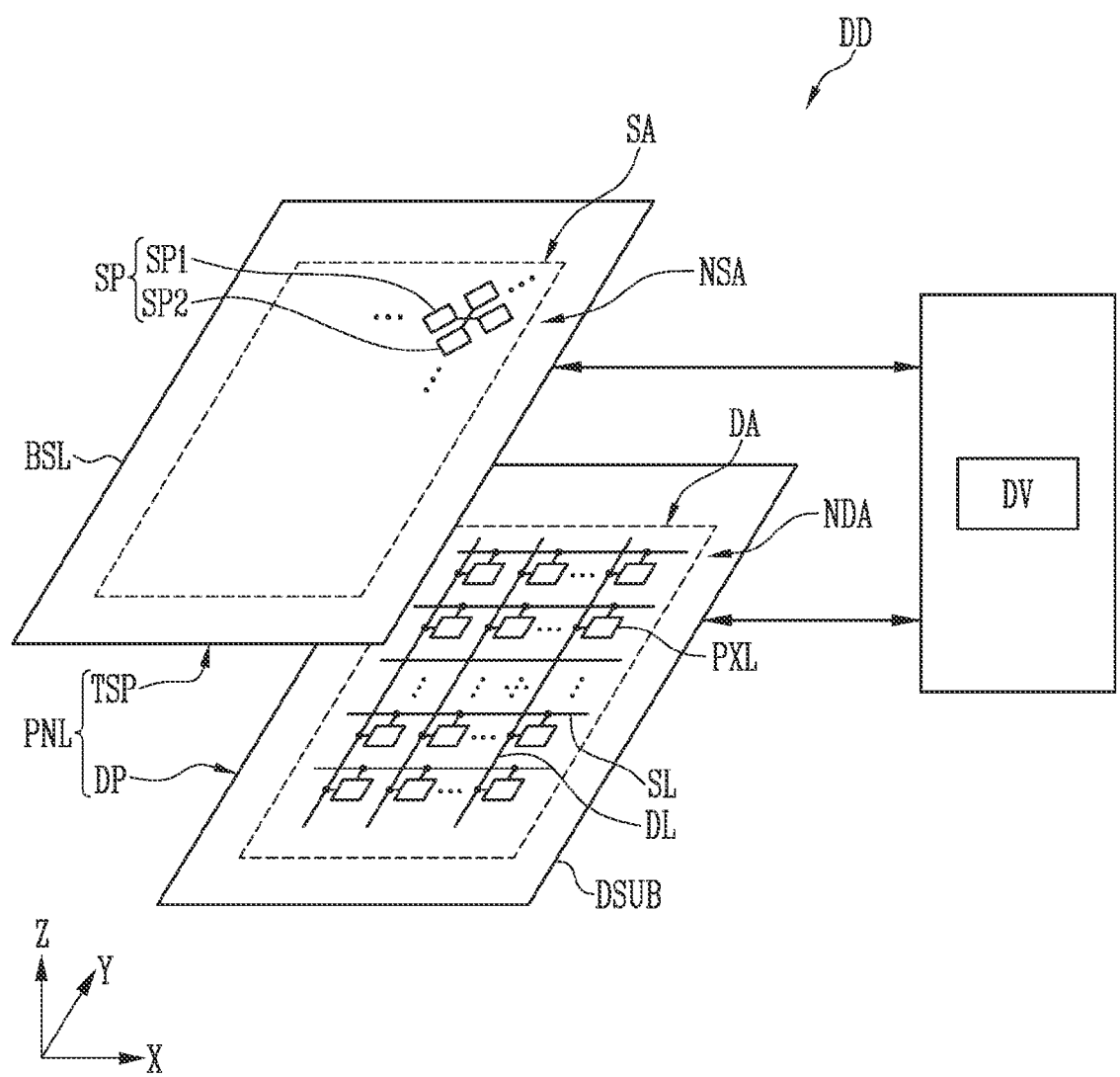
FIG. 1 is a schematic view illustrating a display device in accordance with one or more embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on,"

"connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" and "at least one of A or B" may include A, B, or A and B. As used herein, "or" generally means "and/or," and the term "and/or" includes any and all combinations of one or more of the associated listed items. For example, the expression, such as "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic view illustrating a display device in accordance with one or more embodiments of the present disclosure. The display device DD may be configured to provide (or emit) light.

Referring to FIG. 1, the display device DD may include a panel PNL and a driver DV for driving the panel PNL. In some embodiments, the display device DD may be a flexible display device. For example, the display device DD may be one of a rollable display device, a bendable display device, and a foldable display device. However, the present disclosure is not necessarily limited to the above.

The panel PNL may include a display unit DP for displaying an image and a sensing layer TSP for sensing a touch input, a pressure input, or the like. For example, the sensing layer TSP may acquire information on a touch input of a user. The sensing layer TSP may include a touch sensor and a fingerprint sensor. The sensing layer TSP may be designated as a sensing panel. The display unit DP may be designated as a display panel.

The panel PNL may include pixels PXL and sensing electrodes SP. In one or more embodiments, the pixels PXL may display an image by using a display frame period as a unit. The sensing electrodes SP may sense an input (e.g., a touch input) of a user by using a sensing frame period as a unit. The sensing frame period and the display frame period may be independent from each other or may be different from each other. The sensing frame period and the display frame period may be synchronized with each other or may be unsynchronized.

The sensing layer TSP including the sensing electrodes SP may acquire information on a touch input of the user. In accordance with one or more embodiments (e.g., a mutual capacitance type), the sensing electrodes SP may include a first sensing electrode SP1 for providing a first sensing signal and a second sensing electrode SP2 for providing a second sensing signal. In some embodiments, the first sensing electrode SP1 may be a transmitter (Tx) pattern electrode, and the second sensing electrode SP2 may be a receiver (Rx) pattern electrode. In some embodiments, information on a touch input (or touch event) may mean including the position of a touch that the user is to provide, and the like. However, in accordance with one or more embodiments (e.g., a self-capacitance type), the sensing electrodes SP may be configured with one kind of sensing electrodes without distinguishing the first sensing electrode SP1 and the second sensing electrode SP2 from each other.

The driver DV may be a Touch Display Driver Integrated Circuit (TDDI) in which a driving function of the display unit DP, and a sensing function of the sensing layer TSP, are integrated in one chip. As the driving function and the sensing function are concurrently or substantially simultaneously performed using one TDDI chip, noise information supplied from the display unit DP can be controlled, so that improved noise performance can be ensured.

In some embodiments, a separate sensing test pad may be provided in one area (e.g., a lower end) of a cell for the purpose of testing of the sensing layer TSP. The sensing layer TSP may be electrically connected to the sensing test pad through a sensing connection line (see "SCL" shown in FIG. 4). The sensing test pad may be cut after the testing of the sensing layer TSP to be separated from the panel PNL. In one or more embodiments, when a space limitation exists in a lower end area of the panel PNL, a sensing signal line (see "SSL" shown in FIG. 4) may be electrically connected to the driver DV through the sensing connection line SCL. The sensing signal line SSL may overlap with a display signal line (see "DSL" shown in FIG. 3) electrically connecting the driver DV and the display unit DP to each other, and accordingly, noise of the sensing signal line SSL may occur. Therefore, in the display device DD in accordance with embodiments of the present disclosure, a power line may be located between the sensing signal line SSL and the display signal line DSL to reduce or minimize the noise of the sensing line SSL. This will be described in detail later with reference to FIGS. 5 to 9.

In one or more embodiments, the display unit DP and the sensing layer TSP may be integrally manufactured. For example, the sensing layer TSP may be formed on at least one substrate constituting the display unit DP (e.g., an upper substrate and/or a lower substrate of the display unit DP, or a thin film encapsulation layer (see "TFE" shown in FIG. 13)), or another insulating layer or various types of functional layers (e.g., an optical layer or a protective layer). Alternatively, after the display unit DP and the sensing layer TSP are manufactured separately from each other, the display unit DP and the sensing layer TSP may be located (or coupled) to overlap with each other in at least one area.

In FIG. 1, it is illustrated that, the sensing layer TSP is located at a front surface of the display unit DP (e.g., an upper surface on which an image is displayed). However, the position of the sensing layer TSP is not limited thereto. For example, the sensing layer TSP may be located at a rear surface or both surfaces of the display unit DP. Alternatively, the sensing layer TSP may be in at least one edge area of the display unit DP.

The display unit DP may include a display substrate DSUB, and pixels PXL provided in the display substrate DSUB. The pixels PXL may be in a display area DA.

The display substrate DSUB (or the display device DD) may include the display area DA in which an image is displayed, and a non-display area NDA as an area except the display area DA. In some embodiments, the display area DA may be in a central area of the display unit DP, and the non-display area NDA may be in an edge area of the display unit DP.

The display substrate DSUB may be a rigid substrate or a flexible substrate, and its material or property is not particularly limited. For example, the display substrate DSUB may be a rigid substrate configured with glass or tempered glass, or a flexible substrate configured with plastic or a thin film made of a metal material.

Scan lines SL and data lines DL, and the pixels PXL connected to the scan lines SL and the data lines DL, are in the display area DA. The pixels PXL may be selected by a scan signal having a turn-on level, which is supplied from the scan lines SL, to be supplied with a data signal from the data lines DL, and may emit light with a luminance corresponding to the data signal. Accordingly, an image corresponding to the data signal can be displayed in the display area DA. However, in the present disclosure, the structure, driving method, and the like of the pixels PXL are not particularly limited. For example, each of the pixels PXL may be implemented as a pixel employing various structures and various driving methods.

Various types of lines and/or a built-in circuit, which may be connected to the pixels PXL of the display area DA, may be in the non-display area NDA. For example, a plurality of lines for supplying various power sources and various control signals to the display area DA may be in the non-display area NDA.

The sensing layer TSP may include a base layer BSL, and a plurality of sensing electrodes SP formed on the base layer BSL. The sensing electrodes SP may be in a sensing area SA on the base layer BSL.

The base layer BSL (or the display device DD) may include the sensing area SA capable of sensing a touch input or the like, and a non-sensing area NSA located at the outside of the sensing area SA. In some embodiments, the sensing area SA may be located to overlap with at least one area of the display area DA. For example, the sensing area SA may be set as an area corresponding to the display area DA (e.g., an area overlapping with the display area DA), and the non-sensing area NSA may be set as an area corresponding to the non-display area NDA (e.g., an area overlapping with the non-display area NDA). When a touch input or the like is provided on the display area DA, the touch input may be detected through the sensor layer TSP.

The base layer BSL may be a rigid or flexible substrate. In addition, the base layer BSL may be configured with at least one insulating layer. Also, the base layer BSL may be a transparent or translucent transmissive substrate, but the present disclosure is not limited thereto. For example, the base layer BSL may be a rigid substrate configured with glass or tempered glass, or a flexible substrate configured with plastic or a thin film made of a metal material. In some embodiments, at least one substrate (e.g., the display substrate DSUB, an encapsulation substrate, and/or a thin film encapsulation layer) constituting the display unit DP, or at least one insulating layer, at least one functional layer, or the like, which is located at the inside of the display unit DP and/or an outer surface of the display unit DP, may be used as the base layer BSL.

The sensing area SA may be set as an area capable of reacting with a touch input (i.e., an active area of sensors). To this end, sensing electrodes SP for sensing a touch input or the like may be in the sensing area SA.

In one or more embodiments, first sensing electrodes SP1 may be located along a first direction DR1 (X-axis direction). The first sensing electrodes SP1 may be arranged to be spaced apart from each other in a second direction DR2 (Y-axis direction). The second direction DR2 (Y-axis direction) may be a direction intersecting or orthogonal to the first direction DR1 (X-axis direction). The first sensing electrodes SP1 may have a form in which the first sensing electrodes SP1 are connected to each other by first connection electrodes (see "BRP1" shown in FIG. 11).

In one or more embodiments, second sensing electrodes SP2 may be located along the second direction DR2 (Y-axis direction). The second sensing electrodes SP2 may be arranged to be spaced apart from each other in the first direction DR1 (X-axis direction). The second sensing electrodes SP2 may have a form in which the second sensing electrodes SP2 are connected to each other by second connection electrodes (see "BRP2" shown in FIG. 11).

In one or more embodiments, the first sensing electrodes SP1 and the second sensing electrodes SP2 may have the same (e.g., substantially the same) shape. For example, the first sensing electrodes SP1 as TX pattern electrodes and the second sensing electrodes SP2 as Rx pattern electrodes may have substantially the same shape, and accordingly, the sensing performance of a touch event in the sensing area SA can be uniformly set.

The driver DV for driving the sensing electrodes SP, and sensing lines for electrically connecting the sensing electrodes SP and the driver DV to each other, may be further located in the non-sensing area NSA of the sensing layer TSP.

The driver DV may be formed in the non-display area NDA or the non-sensing area NSA. However, the present disclosure is not limited to the above. The driver DV may be electrically connected to the display unit DP to drive the pixels PXL, and may be electrically connected to the sensing layer TSP to drive the sensing electrodes SP.

Figure 2:
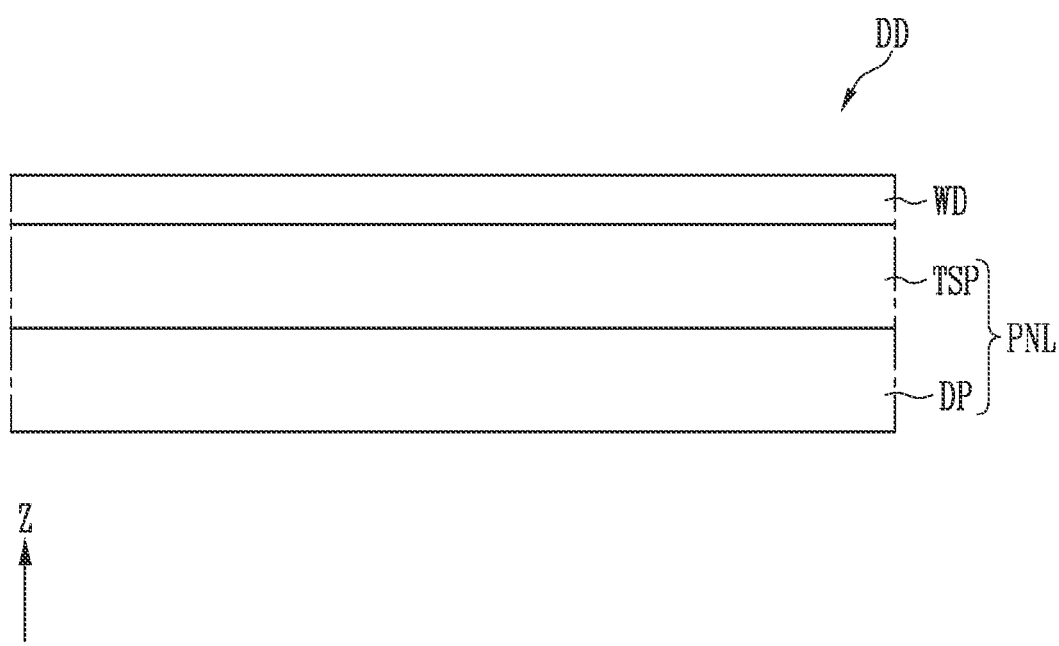
FIG. 2 is a schematic sectional view illustrating a stacked structure of the display device in accordance with one or more embodiments of the present disclosure.

FIG. 2 is a schematic sectional view illustrating a stacked structure of the display device in accordance with one or more embodiments of the present disclosure.

Referring to FIG. 2, the sensing layer TSP may be located (or stacked) on the display unit DP, and a window WD may be located (or stacked) on the sensing layer TSP (or the panel PNL).

The display unit DP may output visual information (e.g., an image). In some embodiments, the type/kind of the display unit DP is not particularly limited. For example, the display unit DP may be implemented as a self-luminescent display panel, such as an organic light-emitting display panel. However, when the display unit DP is implemented as a self-luminescent display panel, each pixel is not necessarily limited to a case where the pixel includes only an organic light-emitting element. For example, a light-emitting element of each pixel may be configured as an organic light-emitting diode, an inorganic light-emitting diode, a quantum dot/well light-emitting diode, or the like. Alternatively, the display unit DP may be implemented as a non-light-emitting display panel, such as a liquid crystal display panel. When the display unit DP is implemented as a non-light-emitting display panel, the display device DD may additionally include a light source, such as a back-light unit. Hereinafter, for convenience of description, one or more embodiments in which the display unit DP is implemented as an organic light-emitting display panel will be mainly described.

The sensing layer TSP may acquire information on an input provided from the user. In one or more embodiments, the sensor unit TSP may recognize a touch input. The sensing layer TSP may recognize a touch input by using a capacitive sensing type. The sensing layer TSP may sense a touch input by using a mutual capacitance type or sense a touch input by using a self-capacitance type. In the present disclosure, for convenience of description, one or more embodiments in which a touch input is sensed using the mutual capacitance type will be mainly described.

The window WD is a protective member located at the outside of the display device DD, and may be a substantially transparent transmissive substrate. The window WD may have a multi-layer structure selected from a glass substrate, a plastic film, and a plastic substrate. The window WD may include a rigid or flexible base, and the material constituting the window WD is not particularly limited.

In one or more embodiments, the display device DD may further include a polarizing plate, an anti-reflection layer, or the like, which is used to reduce or prevent external light reflection between the window WD and the sensing layer TSP.

Figure 3:
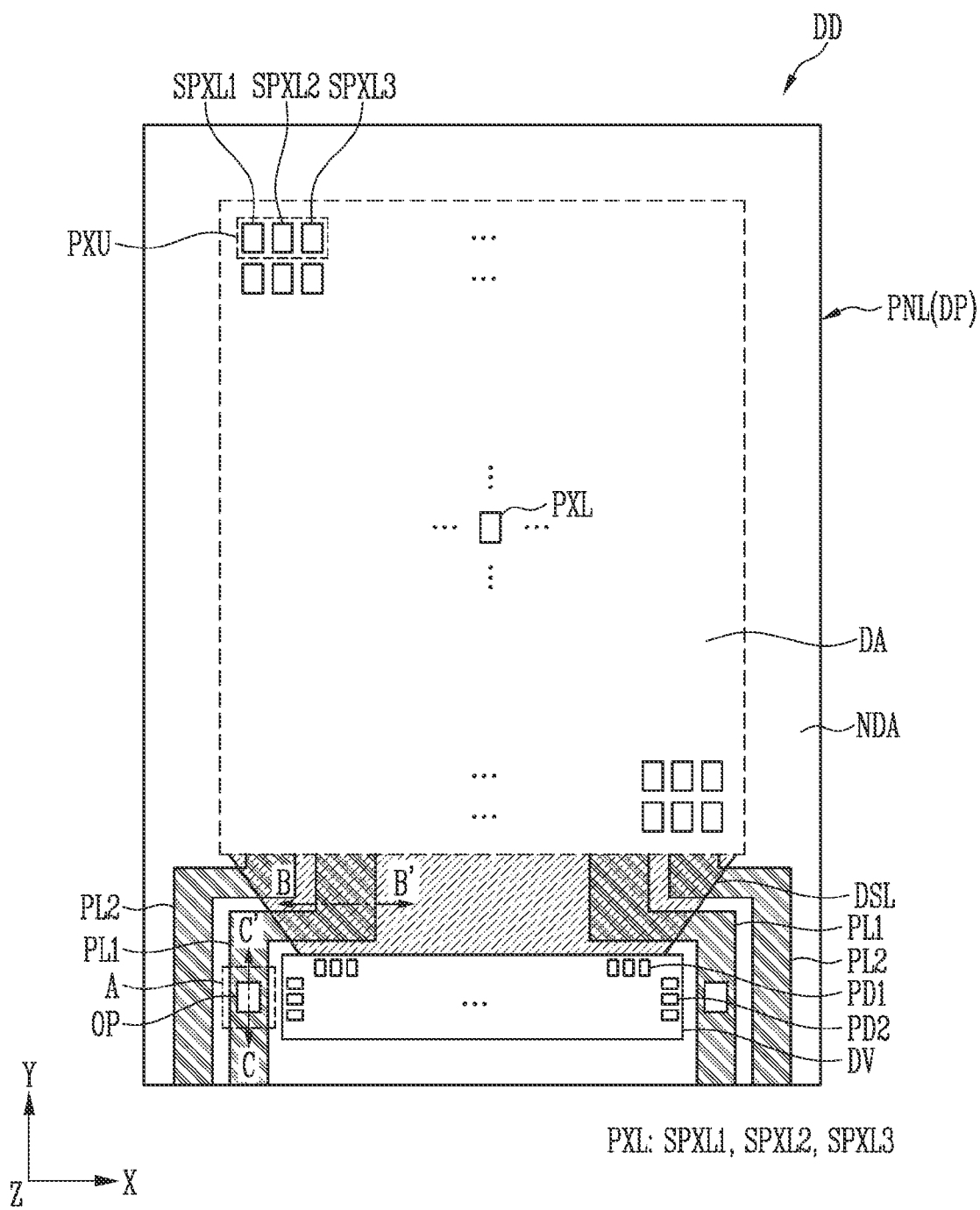
FIG. 3 is a schematic plan view illustrating a display device in accordance with one or more embodiments of the present disclosure.

FIG. 3 is a schematic plan view illustrating a display device in accordance with one or more embodiments of the present disclosure. For example, FIG. 3 may illustrate a panel PNL, based on a display unit DP of the display device DD.

Referring to FIG. 3, pixels PXL may be arranged according to one arrangement structure in a display area DA. For example, the pixels PXL may be arranged according to a stripe arrangement structure, a PENTILET arrangement structure (e.g., a RGBG matrix structure, a PENTILET matrix structure, a PENTILE™ structure, or an RGBG structure, PENTILET being a registered trademark of Samsung Display Co., Ltd., Republic of Korea), or the like. However, the present disclosure is not necessarily limited to the above.

Each pixel PXL may include a first sub-pixel SPXL1, a second sub-pixel SPXL2, and a third sub-pixel SPXL3. At least one first sub-pixel SPXL1, at least one second sub-pixel SPXL2, and at least one third sub-pixel SPXL3 may form one pixel unit PXU capable of emitting lights of various colors.

For example, each of the first sub-pixel SPXL1, the second sub-pixel SPXL2, and the third sub-pixel SPXL3 may respectively emit light of one corresponding color. For example, the first sub-pixel SPXL1 may be a red pixel emitting light of red (e.g., a first color), the second sub-pixel SPXL2 may be a green pixel emitting light of green (e.g., a second color), and the third sub-pixel SPXL3 may be a blue pixel emitting light of blue (e.g., a third color). In some embodiments, a number of second sub-pixels SPXL2 may be greater than a number of first sub-pixels SPXL1 and may be greater than a number of third sub-pixels SPXL3. However, colors, kinds, and/or numbers of first, second, and third sub-pixels SPXL1, SPXL2, and SPXL3 forming each pixel unit PXU are not particularly limited.

The panel PNL may include a driver DV, a display signal line DSL, a first power line PL1, and/or a second power line PL2, which are in a non-display area NDA.

The driver DV may include a first pad PD1. In one or more embodiments, the first pad PD1 may be a display pad. The display signal line DSL may be electrically connected to the first pad PD1 of the driver DV. In one or more embodiments, the display signal line DSL may extend from the first pad PD1, thereby being electrically connected to the pixel PXL. Accordingly, an electrical signal provided by the driver DV can be applied to the pixel PXL through the first pad PD1 and the display signal line DSL.

The first power line PL1 and the second power line PL2 may extend from the non-display area NDA, thereby being electrically connected to the pixel PXL. The first power line PL1 and the second power line PL2 may have different potentials. In one or more embodiments, the first power line PL1 may be a high-potential power line, and the second power line PL2 may be a low-potential power line. However, the present disclosure is not necessarily limited thereto.

At least one of the first power line PL1 and/or the second power line PL2 may include/define an opening (e.g., an opening or indentation) OP. In one or more embodiments, the first power line PL1 may include/define an opening OP overlapping with a sensing connection line SCL and/or a sensing signal line SSL, which will be described later. The sensing signal line SSL may be electrically connected to the sensing connection line SCL through the opening OP of the first power line PL1. The opening OP will be described in detail later with reference to FIGS. 5 to 9.

Figure 4:
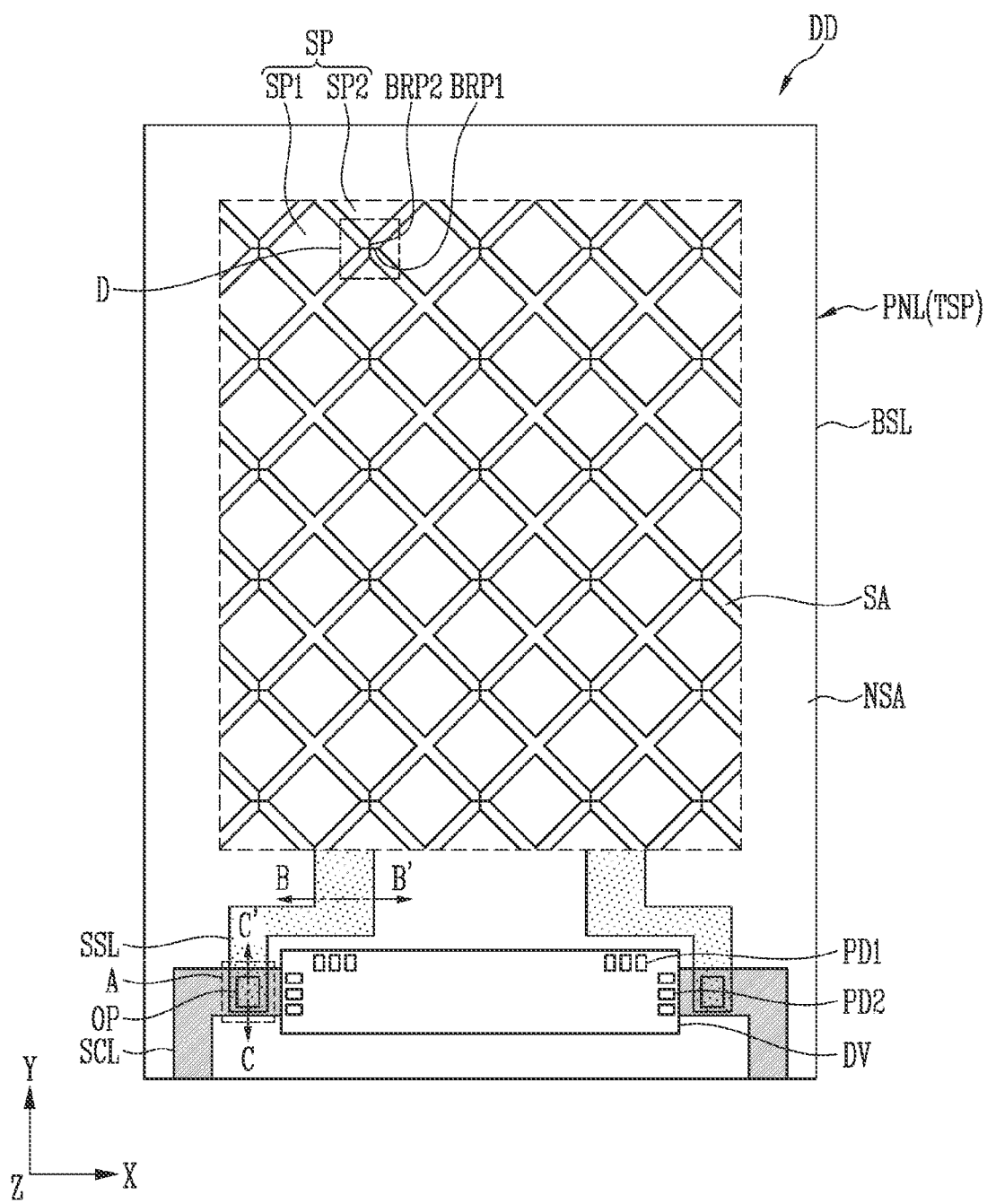
FIG. 4 is a schematic plan view illustrating a display device in accordance with one or more embodiments of the present disclosure.

FIG. 4 is a schematic plan view illustrating a display device in accordance with one or more embodiments of the present disclosure. For example, FIG. 4 may illustrate a panel PNL, based on a sensing layer TSP of the display device DD.

Referring to FIG. 4, the panel PNL may include a driver DV, a sensing signal line SSL, and/or a sensing connection line SCL, which are in a non-sensing area NSA.

The driver DV may include a second pad PD2. In one or more embodiments, the second pad PD2 may be a sensing pad. The sensing connection line SCL may be electrically connected to the second pad PD2. One end of the sensing connection line SCL may be electrically connected to the second pad PD2, and the other end of the sensing connection line SCL may be electrically connected to a sensing test pad. Accordingly, whether a failure has occurred in the sensing layer TSP can be tested through the sensing connection line SCL. In one or more embodiments, the sensing test pad may be cut, following a sensing test, to be separated from the panel PNL.

The sensing signal line SSL may be electrically connected to the sensing connection line SCL. One end of the sensing signal line SSL may be electrically connected to the sensing connection line SCL, and the other end of the sensing signal line SSL may be electrically connected to sensing electrodes SP of a sensing area SA. Accordingly, an electrical signal provided by the driver DV can be applied to the sensing electrodes SP through the second pad PD2, the sensing connection line SCL, and the sensing signal line SSL.

In one or more embodiments, the sensing signal line SSL may overlap with the above-described first power line PL1.

The sensing signal line SSL may be electrically connected to the sensing connection line SCL located thereunder through the opening OP of the first power line PL1, as will be described in detail with reference to FIGS. 5 to 9.

Figure 5:
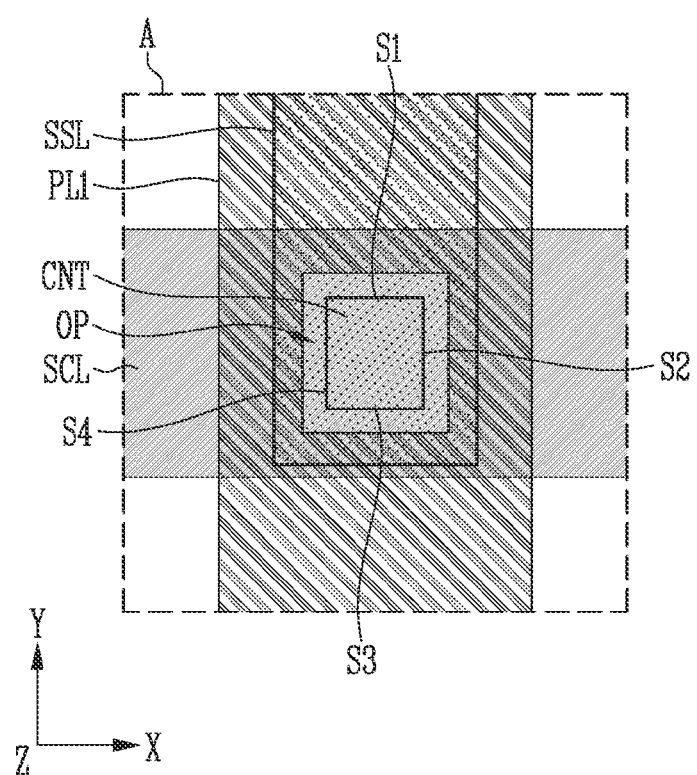
FIGS. 5 to 7 are schematic plan views illustrating area A shown in FIGS. 3 and 4.
Figure 6:
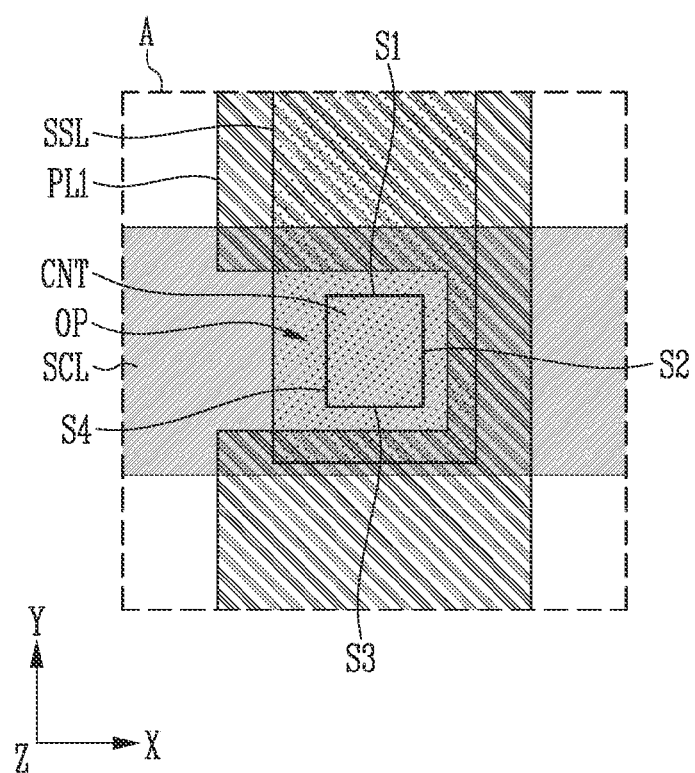
Figure 7:
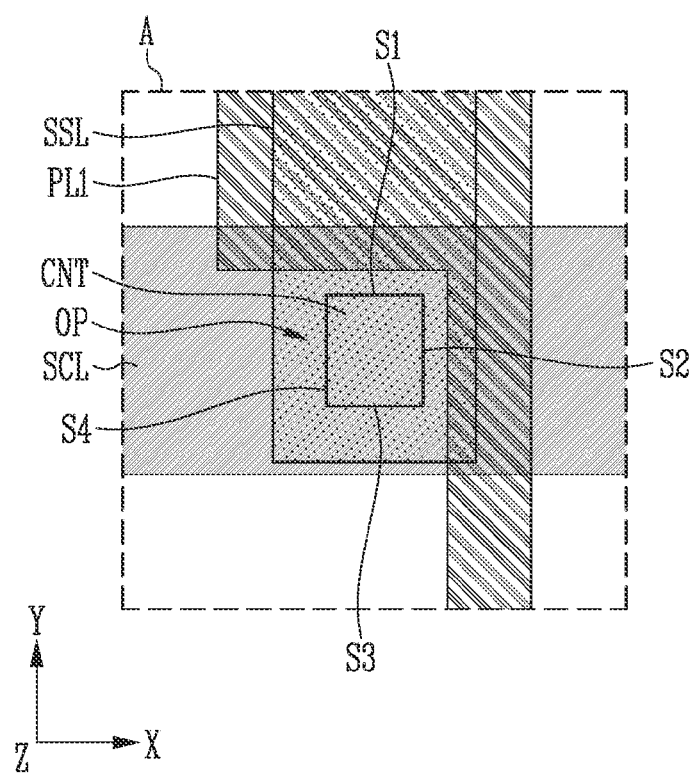
Figure 8:
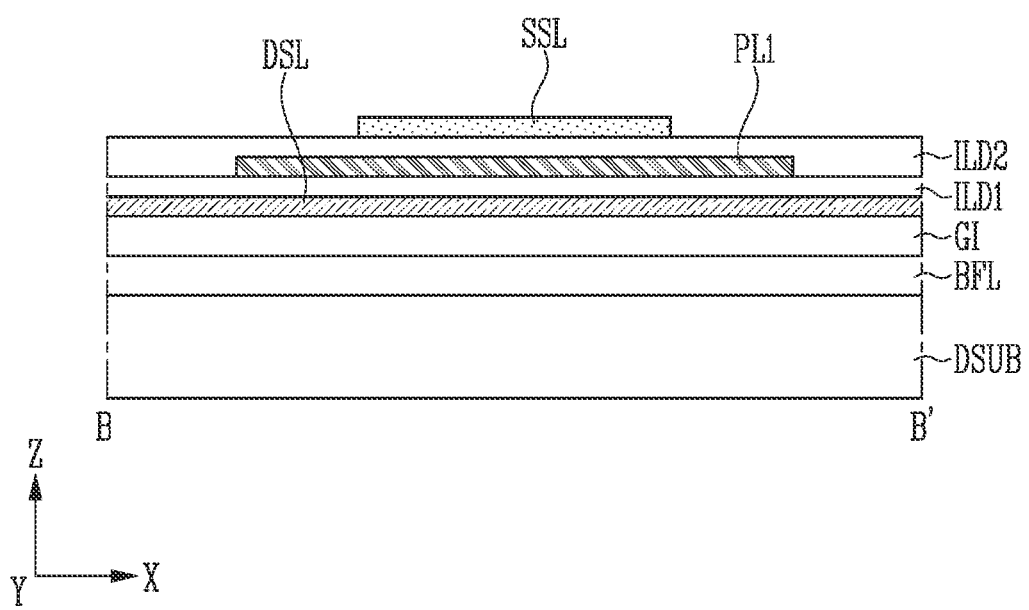
FIG. 8 is a sectional view taken along the line B-B' shown in FIGS. 3 and 4.
Figure 9:
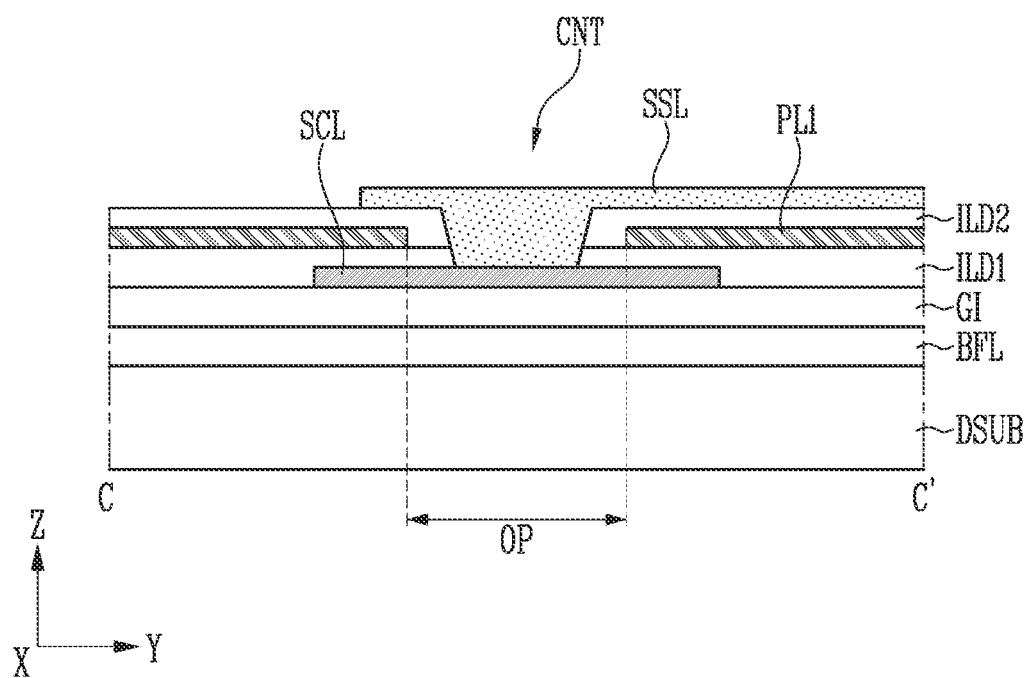
FIG. 9 is a sectional view taken along the line C-C' shown in FIGS. 3 and 4.

FIGS. 5 to 7 are schematic plan views illustrating area A shown in FIGS. 3 and 4. FIG. 8 is a sectional view taken along the line B-B' shown in FIGS. 3 and 4. FIG. 9 is a sectional view taken along the line C-C' shown in FIGS. 3 and 4.

Referring to FIGS. 5 to 9, the first power line PL1 may overlap with the sensing signal line SSL. In one or more embodiments, the first power line PL1 may be located between the sensing signal line SSL and the above-described display signal line DSL to perform shielding. Accordingly, noise of the sensing signal line SSL, which may be caused by the display signal line DSL, can be reduced or minimized. The display signal line DSL may be formed of a first conductive layer, the first power line PL1 may be formed of a second conductive layer, and the sensing signal line SSL may be formed of a third conductive layer. The first conductive layer may be located between a gate-insulating layer GI and a first interlayer insulating layer ILD1, the second conductive layer may be located between the first interlayer insulating layer ILD1 and a second interlayer insulating layer ILD2, and the third conductive layer may be located on the second interlayer insulating layer ILD2.

The sensing signal line SSL may be electrically connected to the sensing connection line SCL through the opening OP of the first power line PL1. The sensing signal line SSL may be electrically connected to the sensing connection line SCL through a contact hole CNT that overlaps the opening OP of the first power line PL1. For example, the sensing signal line SSL may be in contact with the sensing connection line SCL through the contact hole CNT penetrating the first interlayer insulating layer ILD1 and the second interlayer insulating layer ILD2. The sensing connection line SCL may be formed of the first conductive layer located between the gate-insulating layer GI and the first interlayer insulating layer ILD1.

The first power line PL1 may surround or partially surround (e.g., in plan view) at least a portion of an edge of the contact hole CNT. For example, as shown in FIG. 5, the first power line PL1 may surround first to fourth sides S1, S2, S3, and S4 of the contact hole CNT. Alternatively, as shown in FIG. 6, the first power line PL1 may surround the first to third sides S1, S2, and S3, while excluding the fourth side S4, of the contact hole CNT. Alternatively, as shown in FIG. 7, the first power line PL1 may surround the first side S1 and the second side S2, while excluding the third side S3 and the fourth side S4, of the contact hole CNT.

Figure 10:
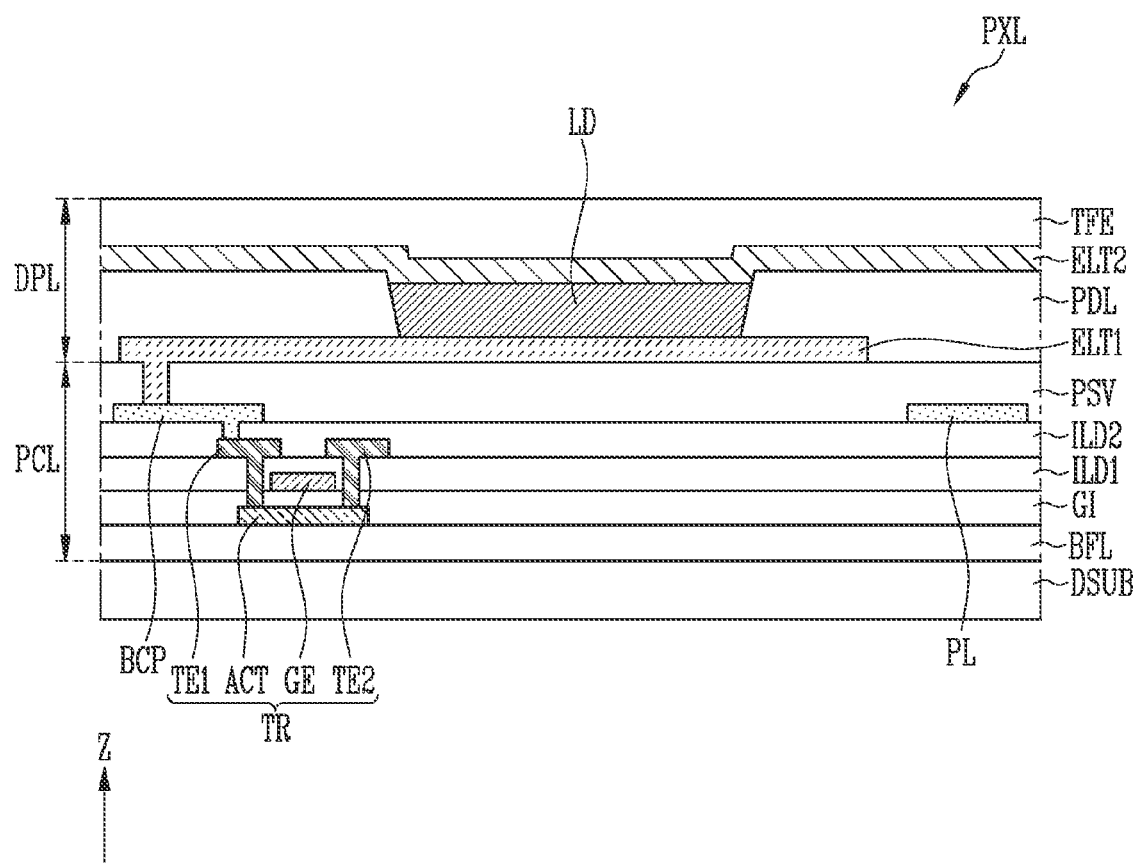
FIG. 10 is a schematic sectional view illustrating a pixel in accordance with one or more embodiments of the present disclosure.

FIG. 10 is a schematic sectional view illustrating a pixel in accordance with one or more embodiments of the present disclosure. For example, FIG. 10 is one or more embodiments in which the display panel DP is an organic light-emitting display panel, and schematically illustrates a sectional structure of a pixel PXL (or any one of sub-pixels SPXL1, SPXL2, and SPXL3).

A display substrate DSUB may provide an area in which a pixel circuit layer PCL and a display element layer DPL are located. The display substrate DSUB may form (or constitute) a base member of the pixel PXL. The display substrate DSUB may be a rigid or flexible substrate or film, but the present disclosure is not particularly limited.

The pixel circuit layer PCL may be located on the display substrate DSUB. The pixel circuit layer PCL may include a buffer layer BFL, a transistor TR, a gate-insulating layer GI, a first interlayer insulating layer ILD1, a second interlayer insulating layer ILD2, a connection pattern BCP, a power line PL, and a protective layer PSV. The buffer layer BFL may be located on the display substrate DSUB. The buffer layer BFL may reduce or prevent the likelihood of an impurity being diffused from the outside. The buffer layer BFL may include at least one of silicon nitride ($SiN_x$), silicon oxide ($SiO_x$), silicon oxynitride ($SiO_xN_y$), and/or a metal oxide, such as aluminum oxide ($AlO_x$).

The transistor TR may be a thin film transistor. In accordance with one or more embodiments, the transistor TR may be a driving transistor. The transistor TR may be electrically connected to a light-emitting element LD. The transistor TR may be electrically connected to the connection pattern BCP.

The transistor TR may include an active layer ACT, a first transistor electrode TE1, a second transistor electrode TE2, and a gate electrode GE.

The active layer ACT may mean a semiconductor layer. The active layer ACT may be located on the buffer layer BFL. The active layer ACT may include one of poly-silicon, Low Temperature Polycrystalline Silicon (LTPS), amorphous silicon, and/or an oxide semiconductor.

The active layer ACT may include a first contact region in contact with the first transistor electrode TE1, and a second contact region in contact with the second transistor electrode TE2. The first contact region and the second contact region may correspond to a semiconductor pattern doped with an impurity. A region between the first contact region and the second contact region may be a channel region. The channel region may correspond to an intrinsic semiconductor pattern undoped with the impurity.

The gate electrode GE may be located on the gate-insulating layer GI. A position of the gate electrode GE may correspond to a position of the channel region of the active layer ACT. For example, the gate electrode GE may be located on the channel region of the active layer ACT with the gate-insulating layer GI interposed therebetween.

The gate-insulating layer GI may be located over the active layer ACT. The gate-insulating layer GI may include an inorganic material. In one or more embodiments, the gate-insulating layer GI may include at least one of silicon nitride ($SiN_x$), silicon oxide ($SiO_x$), silicon oxynitride ($SiO_xN_y$), and/or aluminum oxide ($AlO_x$).

The first interlayer insulating layer ILD1 may be located over the gate electrode GE. Like the gate-insulating layer GI, the first interlayer insulating layer ILD1 may include at least one of silicon nitride ($SiN_x$), silicon oxide ($SiO_x$), silicon oxynitride ($SiO_xN_y$), and/or aluminum oxide ($AlO_x$).

The first transistor electrode TE1 and the second transistor electrode TE2 may be located on the first interlayer insulating layer ILD1. The first transistor electrode TE1 may be in contact with the first contact region of the active layer ACT while penetrating the gate-insulating layer GI and the first interlayer insulating layer ILD1, and the second transistor electrode TE2 may be in contact with the second contact region of the active layer ACT while penetrating the gate-insulating layer GI and the first interlayer insulating layer ILD1. In one or more embodiments, the first transistor electrode TE1 may be a drain electrode, and the second transistor electrode TE2 may be a source electrode. However, the present disclosure is not limited thereto.

The second interlayer insulating layer ILD2 may be located over the first transistor electrode TE1 and the second transistor electrode TE2. Like the first interlayer insulating layer ILD1 and the gate-insulating layer GI, the second interlayer insulating layer ILD2 may include an inorganic material. The inorganic material may include at least one of the materials of the first interlayer insulating layer ILD1 and/or the gate-insulating layer GI (e.g., silicon nitride ($SiN_x$), silicon oxide ($SiO_x$), silicon oxynitride ($SiO_xN_y$), and/or aluminum oxide ($AlO_x$)).

The connection pattern BCP may be located on the second interlayer insulating layer ILD2. The connection pattern BCP may be connected to the first transistor electrode TE1 through a contact hole penetrating the second interlayer insulating layer ILD2. The connection pattern BCP may be electrically connected to a first electrode ELT1 through a contact part formed in the protective layer PSV.

The power line PL may be located on the second interlayer insulating layer ILD2. The power line PL may be electrically connected to a second electrode ELT2 through another contact part formed in the protective layer PSV.

The protective layer PSV may be located on the second interlayer insulating layer ILD2. The protective layer PSV may cover the connection pattern BCP and the power line PL. The protective layer PSV may be provided in a form including an organic insulating layer, an inorganic insulating layer, or the organic insulating located on the inorganic insulating layer, but the present disclosure is not limited thereto. In accordance with one or more embodiments, the contact part connected to one area of the connection pattern BCP and the another contact part connected to one area of the power line PL may be formed in the protective layer PSV.

The display element layer DPL may be located on the pixel circuit layer PCL. The display element layer DPL may include the first electrode ELT1, the light-emitting element LD, a pixel-defining layer PDL, the second electrode ELT2, and a thin film encapsulation layer TFE.

In accordance with one or more embodiments, the light-emitting element LD may be in an area defined by the pixel-defining layer PDL. One surface of the light-emitting element LD may be connected to the first electrode ELT1, and the other surface of the light-emitting element LD may be connected to the second electrode ELT2.

The first electrode ELT1 may be an anode electrode of the light-emitting element LD, and the second electrode ELT2 may be a common electrode (or cathode electrode) of the light-emitting element LD. In accordance with one or more embodiments, the first electrode ELT1 and the second electrode ELT2 may include a conductive material. For example, the first electrode ELT1 may include a conductive material including a reflective property, and the second electrode ELT2 may include a transparent conductive material. However, the present disclosure is not necessarily limited thereto.

In accordance with one or more embodiments, the light-emitting element LD may have a multi-layer thin film structure including a light generation layer. The light-emitting element LD may include a hole injection layer for injecting holes, a hole transport layer for increasing a hole recombination opportunity by suppressing movement of electrons, which are excellent in transportability of holes and are not combined in a light generation layer, the light generation layer for emitting light by recombination of the injected electrons and holes, a hole-blocking layer for suppressing the movement of the holes that are not combined in the light generation layer, an electron transport layer for smoothly transporting the electrons to the light generation layer, and an electron injection layer for injecting the electrons. The light-emitting element LD may release light based on an electrical signal provided from the first electrode ELT1 and the second electrode ELT2.

The pixel-defining layer PDL may define a position at which the light-emitting element LD implemented as an organic light-emitting diode is arranged. The pixel-defining layer PDL may include an organic material. In one or more embodiments, the pixel-defining layer PDL may include at least one of acrylic resin, epoxy resin, phenolic resin, polyamide resin, and/or polyimide resin, but the present disclosure is not limited thereto.

The thin film encapsulation layer TFE may be located over the second electrode ELT2. The thin film encapsulation layer TFE may planarize a step difference occurring due to the light-emitting element LD and the pixel-defining layer PDL. The thin film encapsulation layer TFE may include a plurality of insulating layers covering the light-emitting element LD. In one or more embodiments, the thin film encapsulation layer TFE may have a structure in which an inorganic layer and an organic layer are alternately stacked.

Figure 11:
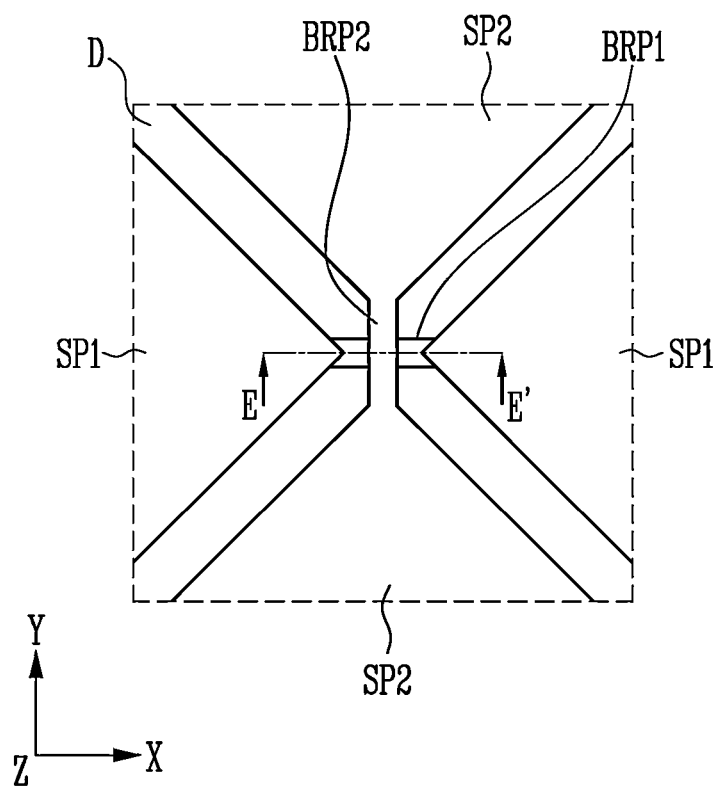
FIG. 11 is a schematic plan view illustrating area D shown in FIG. 4.
Figure 12:
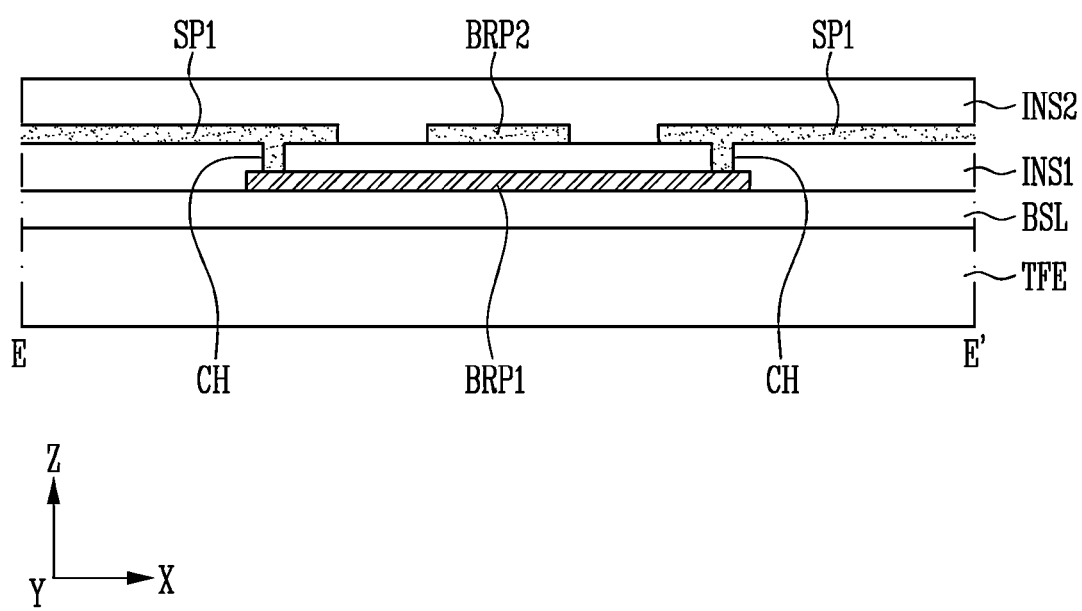
FIG. 12 is a sectional view taken along the line E-E' shown in FIG. 11.
Figure 13:
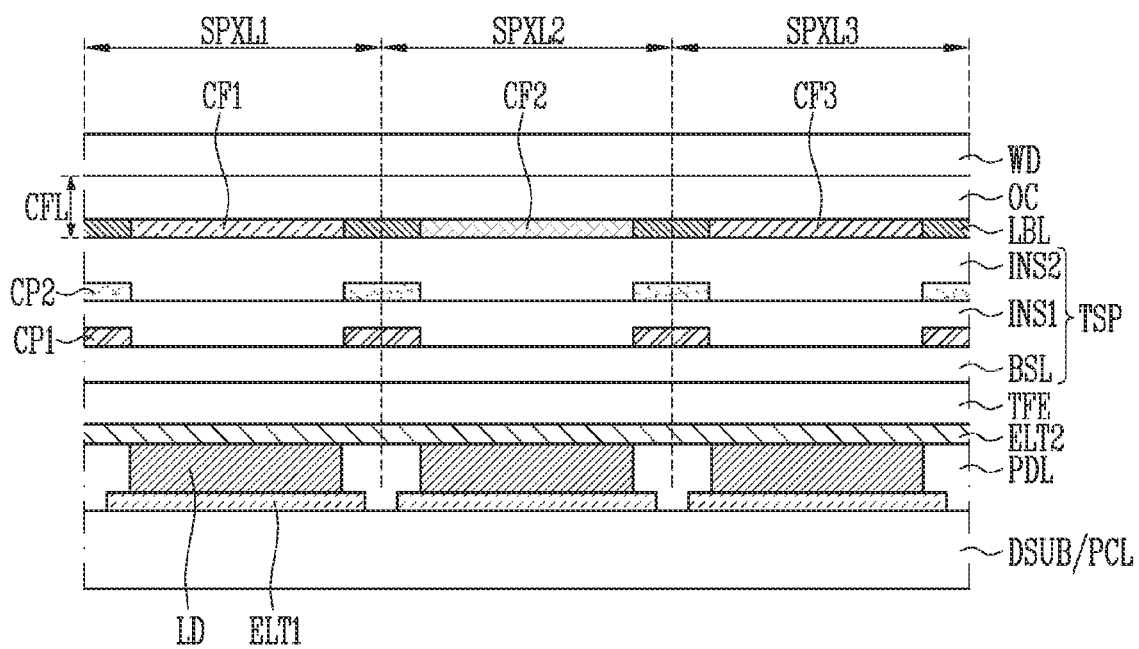
FIG. 13 is a schematic sectional view illustrating a stacked structure of a display device in accordance with one or more embodiments of the present disclosure.

Hereinafter, a sensing layer TSP in accordance with one or more embodiments of the present disclosure will be described with reference to FIGS. 11 to 13. In FIGS. 11 to 13, descriptions of portions overlapping with those described above will be simplified or will not be repeated.

FIG. 11 is a schematic plan view illustrating area D shown in FIG. 4. FIG. 12 is a sectional view taken along the line E-E' shown in FIG. 11. FIG. 13 is a schematic sectional view illustrating a stacked structure of a display device in accordance with one or more embodiments of the present disclosure.

Referring to FIGS. 11 to 13, first sensing electrodes SP1 may be located adjacent to each other along the first direction (X-axis direction). First connection electrodes BRP1 may electrically connect the first sensing electrodes SP1 adjacent to each other in first direction (X-axis direction). The first sensing electrodes SP1 and the first connection electrodes BRP1 may be in different layers. The first sensing electrodes SP1 and the first connection electrodes BRP1, which are in different layers, may be electrically connected to each other through a contact hole CH penetrating a first insulating layer INS1. The first sensing electrodes SP1 may be formed of a second sensing conductive layer CP2. The first connection electrodes BRP1 may be formed of a first sensing conductive layer CP1.

Second sensing electrodes SP2 may be located adjacent to each other along the second direction (Y-axis direction). Second connection electrodes BRP2 may electrically connect the second sensing electrodes SP2 adjacent to each other in the second direction (Y-axis direction). The second sensing electrodes SP2 and the second connection electrodes BRP2 may be in the same layer. The second sensing electrodes SP2 and the second connection electrodes BRP2 may be formed of the second sensing conductive layer CP2.

The sensing layer TSP may be located on the thin film encapsulation layer TFE of the display unit DP. The sensing layer TSP may include a base layer BSL, the first sensing conductive layer CP1, the first insulating layer INS1, the second sensing conductive layer CP2, and a second insulating layer INS2.

The base layer BSL may be located on the thin film encapsulation layer TFE. The base layer BSL may provide an area in which the first sensing conductive layer CP1, the first insulating layer INS1, the second sensing conductive layer CP2, and the second insulating layer INS2 are located. In some embodiments, the base layer BSL may be omitted. The first sensing conductive layer CP1 may be located on the thin film encapsulation layer TFE.

The first sensing conductive layer CP1 may be located on the base layer BSL. The second sensing conductive layer CP2 may be located on the first insulating layer INS1. The first sensing conductive layer CP1 and the second sensing conductive layer CP2 may be spaced apart from each other with the first insulating layer INS1 interposed therebetween.

The first sensing conductive layer CP1 and the second sensing conductive layer CP2 may include a single-layer or multi-layer metal layer. The first sensing conductive layer CP1 and the second sensing conductive layer CP2 may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and/or the like, or alloys thereof. In some embodiments, the first sensing conductive layer CP1 and the second sensing conductive layer CP2 may include at least one of various transparent conductive materials including one of silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and/or the like.

The first insulating layer INS1 may be located over the first sensing conductive layer CP1. The first insulating layer INS1 may be located between the first sensing conductive layer CP1 and the second sensing conductive layer CP2. The second insulating layer INS2 may be located over the second sensing conductive layer CP2.

Each of the first insulating layer INS1 and the second insulating layer INS2 may include an inorganic material or an organic material. In one or more embodiments, the inorganic material may include silicon nitride ($SiN_x$), silicon oxide ($SiO_x$), silicon oxynitride ($SiO_xN_y$), aluminum oxide ($AlO_x$), and/or the like. The organic material may include at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and/or perylene-based resin.

A color filter layer CFL may be located on the sensing layer TSP. The color filter layer CFL may be located on the second insulating layer INS2. The color filter layer CFL may include color filters CF1, CF2, and CF3 capable of allowing light of one color to be selectively transmitted therethrough. Accordingly, light of a color corresponding to each of sub-pixels SPXL1, SPXL2, and SPXL3 can be emitted, and the display device DD can more clearly display a full-color image.

The color filter layer CFL may include a first color filter CF1 located in a first sub-pixel SPXL1 to allow light emitted from the first sub-pixel SPXL1 to be selectively transmitted therethrough, a second color filter CF2 located in a second sub-pixel SPXL2 to allow light emitted from the second sub-pixel SPXL2 to be selectively transmitted therethrough, and a third color filter CF3 located in a third sub-pixel SPXL3 to allow light emitted from the third sub-pixel SPXL3 to be selectively transmitted therethrough. The color filter layer CFL may further include a light-blocking layer LBL and an overcoat layer OC.

In one or more embodiments, the first color filter CF1, the second color filter CF2, and the third color filter CF3 may be respectively a red color filter, a green color filter, and a blue color filter. However, the present disclosure is not necessarily limited thereto.

The first color filter CF1 may include a color filter material that allows light of a first color (or red) to be selectively transmitted therethrough. For example, when the first sub-pixel SPXL1 is a red pixel, the first color filter CF1 may include a red color filter material. The second color filter CF2 may include a color filter material that allows light of a second color (or green) to be selectively transmitted therethrough. For example, when the second sub-pixel SPXL2 is a green pixel, the second color filter CF2 may include a green color filter material. The third color filter CF3 may include a color filter material that allows light of a third color (or blue) to be selectively transmitted therethrough. For example, when the third sub-pixel SPXL3 is a blue pixel, the third color filter CF3 may include a blue color filter material.

In accordance with one or more embodiments, the light-blocking layer LBL may be located between the first to third sub-pixels SPXL1, SPXL2, and SPXL3 (or between the first to third color filters CF1, CF2, and CF3). When the light-blocking layer LBL is located between the first to third sub-pixels SPXL1, SPXL2, and SPXL3 (or between the first to third color filters CF1, CF2, and CF3), a color mixture defect viewed at the front or side of the display device DD can be reduced or prevented. The light-blocking layer LBL may include various light-blocking materials. For example, the light-blocking layer LBL may include a black matrix. In some embodiments, the light-blocking layer LBL may have a structure in which the first to third color filters CF1, CF2, and CF3 are stacked.

The overcoat layer OC may be located over the light-blocking layer LBL and the first to third color filters CF1, CF2, and CF3. The overcoat layer OC may be provided throughout the first to third sub-pixels SPXL1, SPXL2, and SPXL3. The overcoat layer OC may cover components located thereunder, and may reduce or prevent moisture or air from infiltrating into a lower member. Also, the overcoat layer OC may protect the components located thereunder from a foreign matter, such as dust.

The overcoat layer OC may include an organic material, such as acrylic resin, epoxy resin, phenolic resin, polyamide resin, polyimide resin, unsaturated polyester resin, poly-phenylene ether resin, poly-phenylene sulfide resin, or ben-zocyclobutene (BCB). However, the present disclosure is not necessarily limited thereto, and the overcoat layer OC may include various kinds of inorganic materials, including silicon oxide ($SiO_x$), silicon nitride ($SiN_x$), silicon oxynitride ($SiO_xN_y$), aluminum nitride ($AlN_x$), aluminum oxide ($AlO_x$), zirconium oxide ($ZrO_x$), hafnium oxide ($HfO_x$), and/or titanium oxide ($TiO_x$).

A window WD may be located on the overcoat layer OC. The window WD is a protective member located at an outer portion of the display device DD, and may be a substantially transparent transmissive substrate. The window WD may have a multi-layer structure selected from a glass substrate, a plastic film, and a plastic substrate. The window WD may include a rigid or flexible base, and the material constituting the window WD is not particularly limited.

In accordance with the present disclosure, a power line is located between a display line and a sensing line, so that noise of the sensing line, which is caused by the display line, can be reduced or minimized.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with any particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display device comprising:
a pixel in a display area;
sensing electrodes overlapping the pixel;
a sensing pad in a non-display area;
a sensing connection line in the non-display area, and electrically connected to the sensing pad;
a sensing signal line in the non-display area, and electrically connected to the sensing electrodes; and
a power line extending from the non-display area, and electrically connected to the pixel,
wherein the sensing signal line is electrically connected to the sensing connection line through an opening or indentation defined by the power line.

2. The display device of claim 1, wherein the power line at least partially overlaps the sensing signal line.

3. The display device of claim 1, further comprising:
a display pad in the non-display area; and
a display signal line in the non-display area, and electrically connected to the pixel.

4. The display device of claim 3, wherein the power line is between the display signal line and the sensing signal line.

5. The display device of claim 3, wherein the power line at least partially overlaps the display signal line.

6. The display device of claim 1, wherein the sensing electrodes comprise first sensing electrodes located along a first direction.

7. The display device of claim 6, wherein the sensing electrodes further comprise second sensing electrodes located along a second direction intersecting the first direction.

8. The display device of claim 7, further comprising connection electrodes electrically connecting the first sensing electrodes adjacent to each other in the first direction.

9. The display device of claim 8, further comprising:
a first sensing conductive layer;
a second sensing conductive layer on the first sensing conductive layer; and
an insulating layer between the first sensing conductive layer and the second sensing conductive layer.

10. The display device of claim 9, wherein the first sensing conductive layer comprises the connection electrodes.

11. The display device of claim 10, wherein the second sensing conductive layer comprises the first sensing electrodes and the second sensing electrodes.

12. A display device comprising:
a pixel in a display area;
sensing electrodes overlapping with the pixel;
a sensing pad in a non-display area;
a sensing connection line in the non-display area, and electrically connected to the sensing pad;
a sensing signal line in the non-display area, and electrically connected to the sensing electrodes; and
a power line extending from the non-display area, and electrically connected to the pixel,
wherein the sensing signal line is electrically connected to the sensing connection line through a contact hole, and
wherein the power line surrounds at least a portion of an edge of the contact hole is plan view.

13. The display device of claim 12, wherein the edge of the contact hole comprises first to fourth sides, and the power line surrounds the first side and the second side while excluding the third side and the fourth side.

14. The display device of claim 12, wherein the edge of the contact hole comprises first to fourth sides, and
   wherein the power line surrounds the first to third sides while excluding the fourth side.

15. The display device of claim 12, wherein the power line at least partially overlaps the sensing signal line.

16. The display device of claim 12, further comprising:
   a display pad in the non-display area; and
   a display signal line in the non-display area, and electrically connected to the pixel.

17. The display device of claim 16, wherein the power line at least partially overlaps the display signal line.

18. The display device of claim 16, wherein the display signal line corresponds to a first conductive layer,
   wherein the power line corresponds to a second conductive layer, and
   wherein the sensing signal line corresponds to a third conductive layer.

19. The display device of claim 18, wherein the second conductive layer is between the first conductive layer and the third conductive layer.

20. The display device of claim 18, wherein the sensing connection line corresponds to the first conductive layer.

\* \* \* \* \*